United States Patent [19]
Bo

[11] Patent Number: 5,799,565
[45] Date of Patent: Sep. 1, 1998

[54] CONNECTING ROD FOR SMALL RECIPROCATING MACHINES SUCH AS REFRIGERATOR COMPRESSORS, AND RECIPROCATING MACHINES INCORPORATING SUCH CONNECTING RODS

[75] Inventor: Giuseppe Bo, Rivarolo Canavese, Italy

[73] Assignee: Embraco Europe S.r.L., Turin, Italy

[21] Appl. No.: 791,171

[22] Filed: Jan. 30, 1997

[30] Foreign Application Priority Data

Feb. 2, 1996 [IT] Italy ................. TO96A0071

[51] Int. Cl.⁶ ................................. F16J 1/14
[52] U.S. Cl. ................ 92/187; 92/128; 74/579 E
[58] Field of Search ................ 92/187, 128; 123/197.3, 123/197.4; 74/579 E, 579 R

[56] References Cited

U.S. PATENT DOCUMENTS

| | | | |
|---|---|---|---|
| 1,151,339 | 8/1915 | Browning | 74/579 E |
| 1,786,934 | 12/1930 | Briggs | 74/579 E |
| 3,221,402 | 12/1965 | Lannen | 92/187 |
| 4,380,443 | 4/1983 | Federmann et al. | |
| 4,407,168 | 10/1983 | Andrione et al. | |
| 4,567,815 | 2/1986 | Kocher | |
| 4,836,045 | 6/1989 | Lobig | 74/579 E |
| 4,905,540 | 3/1990 | Hughes et al. | 123/197.3 |
| 5,403,170 | 4/1995 | Blanchi et al. | 92/187 |
| 5,524,507 | 6/1996 | Olmr et al. | 74/579 E |

FOREIGN PATENT DOCUMENTS

| | | |
|---|---|---|
| 2578586 | 9/1986 | France. |
| 2583122 | 12/1986 | France. |
| 5999108 | 6/1984 | Japan. |
| 5999110 | 6/1984 | Japan. |
| 2170880 | 8/1986 | United Kingdom. |
| 2170881 | 8/1986 | United Kingdom. |
| 2229792 | 10/1990 | United Kingdom. |
| WO8604122 | 7/1986 | WIPO. |
| WO 9007654 | 7/1990 | WIPO. |
| WO9218781 | 10/1992 | WIPO. |

*Primary Examiner*—Thomas E. Denion
*Attorney, Agent, or Firm*—Sughrue, Mion, Zinn, Macpeak & Seas, PLLC

[57] ABSTRACT

The connecting rod comprises two separate main pieces (34, 36) one of which includes a small-end part (38), a stem part (40) and a big-end fork part (42). The other piece is constituted by a cap (46). The big-end fork part (42) and the cap (46) are retained together by means of respective pairs of interfitting ends situated in correspondence with a diametral plane of the eye of the big-end. The interfitting ends of each pair have mutual coupling formations (48).

20 Claims, 6 Drawing Sheets

CONNECTING ROD FOR SMALL RECIPROCATING MACHINES SUCH AS REFRIGERATOR COMPRESSORS, AND RECIPROCATING MACHINES INCORPORATING SUCH CONNECTING RODS

BACKGROUND OF THE INVENTION

The present invention relates to small reciprocating machines such as refrigerator compressors, and relates in particular to a connecting rod intended for these machines.

Connecting rods in which the two main parts are joined by means of threaded members such as screws, bolts and the like, have been known since the invention of the steam engine.

Recent examples of their application to small reciprocating machines can be found in documents GB-A-2 229 792, GB-A-2 170 880, GB-A-2 170 881, U.S. Pat. No. 4,567,815 and WO 90/07654.

These known connecting rods do not lend themselves to rapid assembly due to the fact that assembly involves a screwing operation of threaded members.

SUMMARY OF THE INVENTION

The main object of the present invention is that of providing a connecting rod of the type comprising two main parts of simple configuration which can therefore be produced economically, comparable to that of known connecting rods of the type considered above, and which furthermore lend themselves to rapid assembly with simple manual or mechanised operations, with a consequent reduction in production costs with respect to known connecting rods.

According to the invention this object is achieved by means of a connecting rod for small reciprocating machines such as refrigerator compressors, of the type comprising two separate main pieces, one of which includes a small-end part, a stem part extending in a longitudinal direction of the connecting rod, and a big-end fork part with a semi-cylindrical concave surface, and the other of which is constituted by a cap with a semi-cylindrical concave surface which is fixed to the big-end fork part to complete the big-end of the connecting rod and define, with the two facing concave surfaces, a cylindrical eye, and in which the big-end fork part and the cap are retained together by means of respective pairs of interfitting ends lying on a diametral plane of the eye of -he big-end, wherein the interfitting ends of each pair have mutual coupling formations so shaped that, when coupled together, they at least prevent the two facing concave surfaces from becoming axially offset by sliding in the said diametral plane, and wherein the big-end fork part and the cap are interconnected by hook means at least to prevent the mutual separation of the two concave surfaces in the longitudinal direction of the stem.

Thanks to the proposed arrangement, and as will be understood better from the description with reference to the drawings, a connecting rod according to the invention can be assembled with simple operations to couple the associated pairs of ends of the big-end fork and cap with movements, which may be performed by hand or by machine, parallel to the general plane of the connecting rod and/or normal to this plane.

Connecting rods have already been proposed in which two main parts are interconnected by a mutual coupling and in which these parts are held together by means of clips. Examples of these are given by documents U.S. Pat. No. 4,407,168, FR-A-2 578 586 and WO 92/18781.

In these known connecting rods one of the two parts comprises the small-end and the stem of the connecting rod and the other the big-end of the connecting rod. The two parts have more complex shapes than those of the more conventional connecting rods with threaded connection members and than those of the connecting rod according to the invention.

Because of their less complex shape connecting rods according to the invention can be made at less cost even than known two-part connecting rods.

A connecting rod according to the invention lends itself ideally to production of its two main parts in sintered metal and also in reinforced plastics material such as polyphenyl sulphide (PPS) incorporating glass fibres, for example in the usual proportion of 45–50%.

In the case of sintered workpieces the semi-cylindrical concave surfaces of the connecting rod can be made very precise by subjecting them to a coining operation, before assembly, whereby to calibrate them.

The scope of the invention also comprehends reciprocating machines incorporating a connecting rod according to the invention.

BRIEF DESCRIPTION OF THE DRAWINGS:

The invention will be more clearly understood from a reading of the following detailed description with reference to the attached drawings, given by way of non-limitative example, and in which.

DETAILED DESCRIPTION OF THE INVENTION

Figure 1:
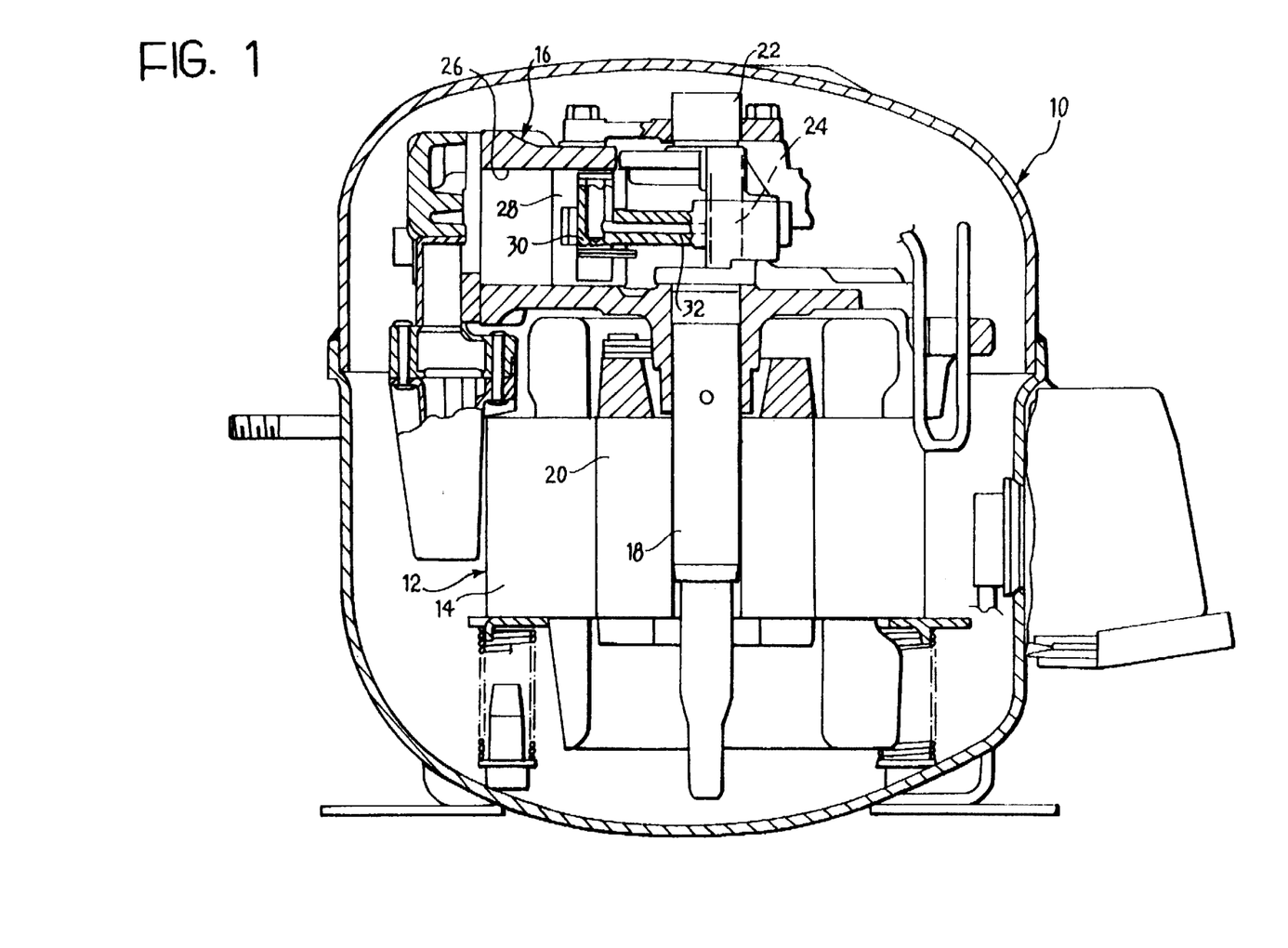
FIG. 1 is a vertical section of a hermetically sealed refrigerator compressor or the like, incorporating a connecting rod according to the invention.

Referring to FIG. 1 a refrigerator compressor, constituting a non-limitative example of a small reciprocating machine incorporating the invention, comprises a hermetically sealed casing generally indicated 10.

Within the casing 10 there is supported a stator structure 12 which includes, among other things, the stator 14 of a vertical axis electric motor.

The stator structure 12 in turn supports a compressor body 16.

Within the body 16 is supported a hollow drive shaft 18 having a vertical axis which carriers the rotor 20 of the electric motor.

To the drive shaft 18 is fixed a crank shaft 22 with a crank pin 24.

In the casing 16 there is formed a cylinder 26 in which is slidable a piston 28 with a gudgeon pin 30. The gudgeon pin 30 and the crank pin 24 are interconnected by a connecting rod 32 according to the invention.

Figure 2:
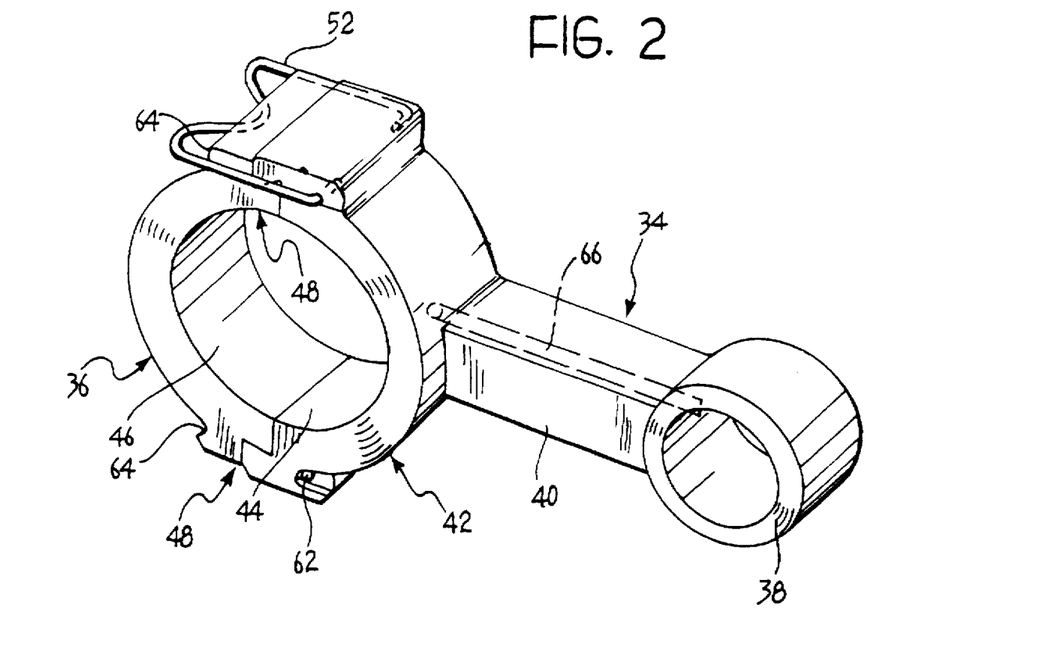
FIG. 2 is a perspective view of a first embodiment of a connecting rod according to the invention.
Figure 3:
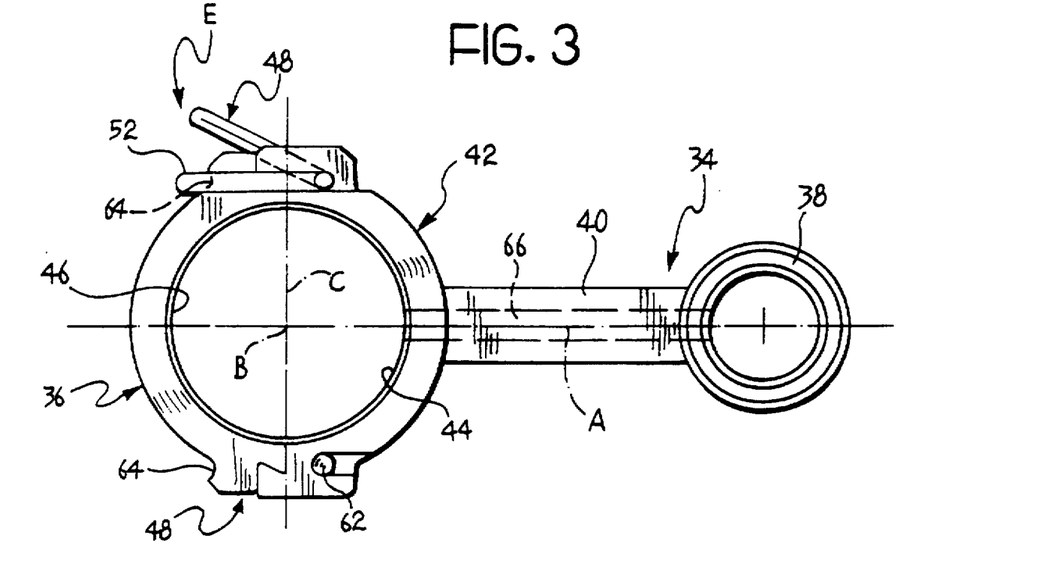
FIG. 3 is a side elevation view thereof.
Figure 4:
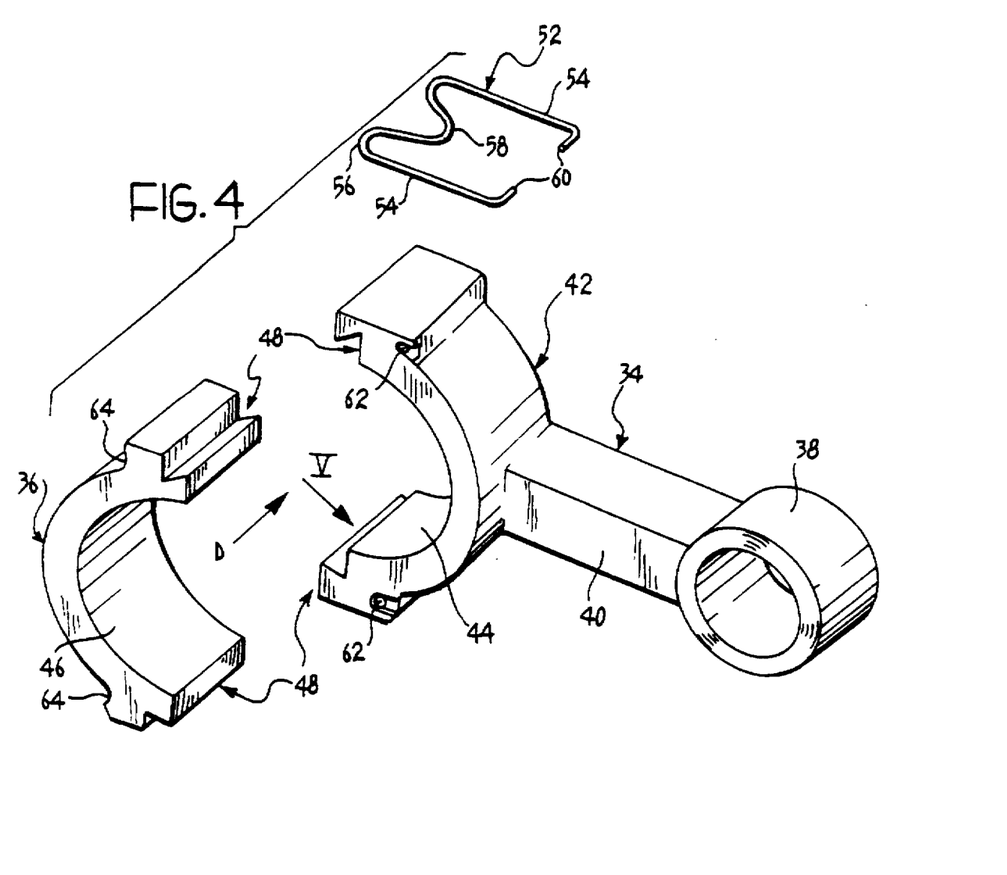
FIG. 4 is an exploded perspective view thereof.
Figure 5:
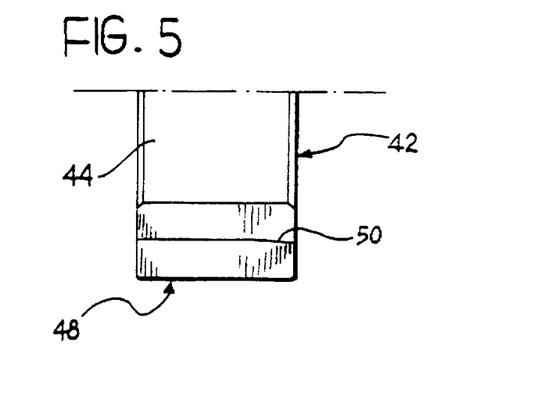
FIG. 5 is a detail view in the direction of the arrow V of FIG. 4.

Referring now to FIGS. 2, 3 and 4, a first embodiment of a connecting rod according to the invention comprises two separate main pieces generally indicated 34 and 36.

The piece 34 includes a substantially cylindrical small-end part 38 of the connecting rod, a stem part 40 and a big-end fork part 42.

The stem part extends longitudinally of the connecting rod, indicated by the axis A in FIG. 3.

The big-end fork 42 has a semi-cylindrical concave surface 44.

The other main part 36 of the connecting rod is constituted by a big-end cap with a semi-cylindrical concave surface 46.

In the assembled condition of the two pieces 34 and 36 the two semi-cylindrical concave surfaces 44 and 46 face one another and define a cylindrical eye the axis of which is designated B in FIG. 3.

In FIG. 3 a diametral plane of the eye of the big-end of the connecting rod is designated C.

In the assembled condition of FIGS. 2 and 3 the big-end fork part 42 and the cap 36 are held together by means of their respective pairs of interfitting ends which are situated in correspondence with the diametral plane C. These interfitting ends are specularly identical and have mutual interengaging formations designated 48, which are configured as a Z-shape coupling. As represented, these coupling formations are so disposed as jointly to define a dovetail joint.

The formations 48, when fitted together, prevent separation of the two facing concave surfaces 44 and 46 by sliding in the diametral plane C. Moreover, the same formations 48 constitute coupling means for preventing mutual separation of the two concave surfaces 44 and 46 in the longitudinal direction A of the stem 40.

The assembly of the connecting rod of FIGS. 2 and 3 can be achieved simply by mutually interfitting the coupling formations 48 starting from one side of the connecting rod, with a movement of the cap 36 towards the fork 42 in the direction of the arrow D of FIG. 4 or vice versa.

To facilitate the initiation of t-he mutual interfitting operation of the formations 48 at least one of these, for example the fork 42, has a slightly bevelled face 50 on one side of the connecting rod from which this interfitting operation starts.

In many cases the mutual coupling of the formations 48 is entirely sufficient to maintain the two pieces 34 and 36 of the connecting rod together as long as it is mounted in a compressor such as that of FIG. 1.

After mounting on to the crank pin 24 of the compressor relative displacement of the concave surfaces 44, 46 which define the eye of the big-end of the connecting rod is prevented by the cheek of the crankshaft which lies alongside the connecting rod 32 (FIG. 1).

There are, however, cases in which it is preferable positively to guarantee that displacement will not take place. Preferably, in order to obtain this guarantee, at least one of the interfitting formations 48 has associated shoulder means.

In the embodiment of FIGS. 2 to 4 the shoulder means comprise a clip 52 associated with one of the pairs of interfitting ends.

Preferably, as illustrated in FIGS. 2 to 4, the clip 52 is in the form of a spring steel wire or equivalent material, shaped into a substantially C-shape configuration.

As indicated in FIG. 4, the C-shape clip 52 has two parallel side arms 54 interconnected by a dorsal section 56 having a mid part 58 re-entrant towards the interior of the C. At the free ends of the lateral sections 54 are two mutually aligned end sections 60 each bent towards the other.

In turn, the big-end fork part 42 has, adjacent the corresponding end, a pair of aligned holes 62 which extend into its sides.

The said end sections 60 of the clip 52 are pivotally engaged in the holes 62.

Adjacent its corresponding end the cap 36 has a notch 64 facing away from the diametral plane C.

With the clip 52 mounted by introducing its aligned ends 60 into the holes 62, when the formations 48 have been fitted together as in FIGS. 2 and 3, the clip 52 is snap-engaged by inserting the re-entrant part 58 into the notch 64 with a rotation in the direction of the arrow E of FIG. 3 from the position indicated in broken outline to that indicated in solid outline.

In this latter position the side arms 54 of the clip extend along the opposite sides of the connecting rod guaranteeing that the big-end fork 42 and the cap 36 cannot slide in such a way as to become disengaged.

In FIGS. 2 to 4 there have also been shown holes 62 and notches 64 not occupied by a clip 52, but which could receive one to constitute a further security against uncoupling sliding movement.

The presence of the two pairs of holes 62 and the two corresponding notches 64 further facilitates the assembly of a clip 52 since it eliminates the need for selecting one side of the connecting rod rather than the other to apply the clip.

According to the invention it is also possible to form an opposite arrangement with a clip pivotally connected to one of the ends of a cap such as 36 and snap-engaging in a corresponding end of a part of a b-g-end fork such as 42.

The connecting rod of FIGS. 2 to 4 lends itself in an excellent way to the production of its two main pieces 34 and 36 by sintering starting from a metal powder, or even by moulding in reinforced plastics material such as PPS reinforced with glass fibres.

In the case of sintered pieces 34 and 36 their semi-cylindrical surfaces 44 and 46, like the cylindrical surface of the eye in the small-end 38 can be finished with a coining operation.

The shank 34 can also have a longitudinal lubrication hole 66 formed in it.

Reference will now be made to FIGS. 6 to 9 to describe a second embodiment of a connecting rod according to the invention.

Figures 6, 8:
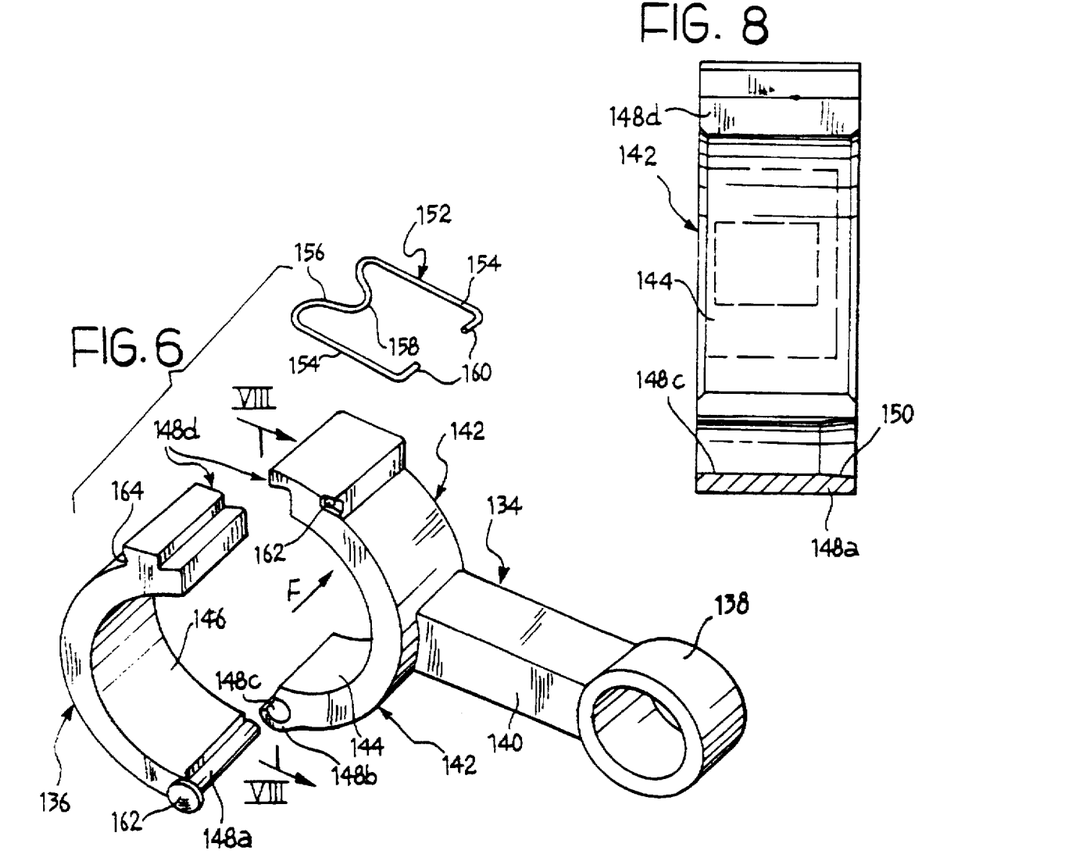
FIG. 6 is an exploded perspective view similar to FIG. 4, of a second embodiment of the connecting rod according to the invention.
FIG. 8 is a diametral section taken on the plane indicated VIII—VIII of FIG. 6.
Figure 7:
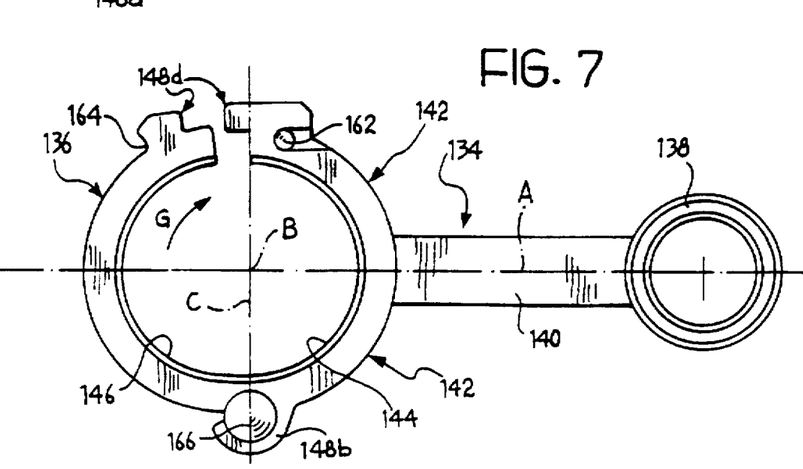
FIG. 7 is a side view of a condition which precedes the coupling of the two parts of the connecting rod.
Figure 9:
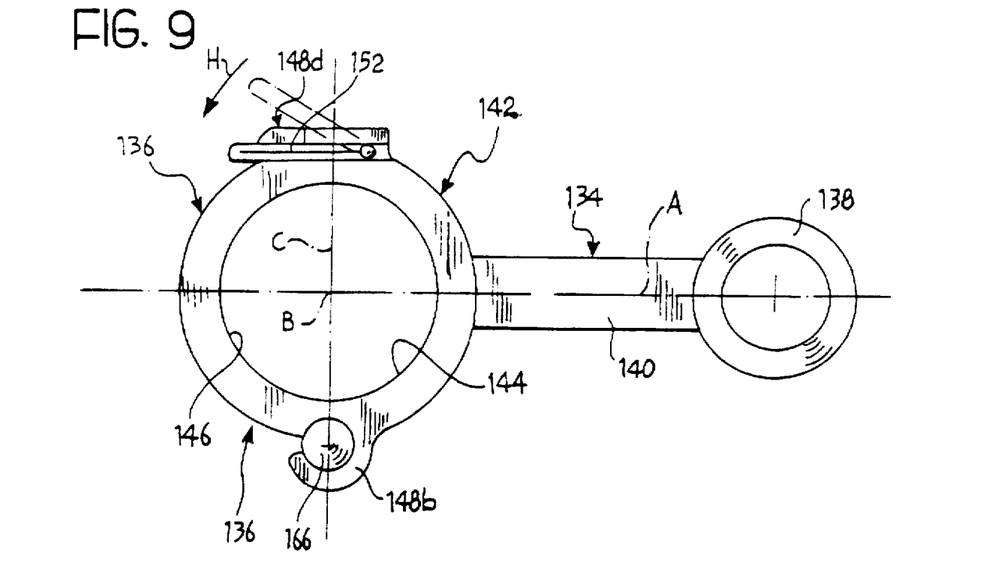
FIG. 9 is a side view similar to FIG. 7, but which represents the connecting rod of the second embodiment in the completely assembled condition.

In FIGS. 7 to 9 the parts which are the same or similar to those of FIGS. 2 to 4 have been designated, as far as possible, with the same reference numerals as the preceding figures, increased by 100.

Certain parts will not be described a second time, or will be described only as far as necessary to make apparent the differences with respect to the preceding embodiment.

The two principal pieces 134, 136 of the connecting rod of FIGS. 6 to 9 are also made preferably in sintered metal or reinforced plastics material as above.

The essential requirement is that a; least part of the big-end fork 142 or at least the cap 136 be capable of a slight elastic deformation to allow its ends to move apart (in the case of the big-end fork 142) or for its two ends to move towards one another, in the case of the cap 136.

At one of their matching ends the big-end fork 142 and the cap 136 have mutually interfitting formations and comprise, on the cap 136, a part-cylindrical formation 148a acting as a pivot pin (FIG. 6). The corresponding end of the big-end fork part 142 has a knuckle housing 148b with a corresponding socket 148c (FIG. 6) of part-cylindrical form. The housing formation 148b is able to surround the pin 148 over more than 180°.

The other pair of matching ends have mutually interfitting formations 148d very similar to the coupling formations 48 of FIGS. 2 to 4, but which when joined form a very much less acute Z-shape coupling.

The arrangement is such as to allow the assembly of the connecting rod by introducing the pin 148a into the socket 148c of the knuckle housing 148b in a direction parallel to the axis of the eye, for example by bringing the cap 136 up to the big-end fork part 142 in the direction of the arrow F of FIG. 6, or vice versa.

This introduction operation takes place with the pieces disposed as in FIG. 7, that is to say with the coupling formations 148d separated from one another.

Once the pin 148a has been introduced completely into its socket 148c the eye of the big-end of the connecting rod can be closed for example by turning the cap in the direction of the arrow G of FIG. 7 to snap-engage the formations 148d as illustrated in FIG. 9.

Preferably, as illustrated in FIG. 8, the socket 148c has a slightly flared section 150 on the side of the big-end from which the pin 148a is introduced, to facilitate the initiation of the introduction operation.

The coupling formations 148d are associated with a clip 152 which is preferably entirely identical to the clip 52 of FIGS. 2 to 4 and the parts of which will not be described again.

For the assembly of the clip 152 the corresponding end of the big-end fork part 142 has aligned holes 162 and the corresponding end of the cap 136 has a snap-engagement notch 164 all in an arrangement similar to that of the embodiment of FIGS. 2 to 4.

The clip 152, which is snap-engaged with a rotation in the direction of the arrow H of FIG. 9 can, by means of its lateral sections 154, perform a shoulder function to prevent uncoupling by sliding of the two pieces 134 and 136 as in the embodiment of FIGS. 2 to 4, but its principal function is that of guaranteeing, in use, that the formations 148d will not become disengaged in the direction of mutual separation of the two concave surfaces 144 and 146 in the longitudinal direction, again indicated A, of the stem 134.

Preferably the connecting rod of FIGS. 6 to 9 is provided with shoulder means independent from the clip 152 and which consist in an enlarged head 166 at one end of the pivot pin 148a.

When the pin 148a has been completely introduced into its socket 148c the head 162 abuts against the corresponding end face of the housing flange formation 148b to constitute a guarantee against offsetting of the two concave surfaces 144 and 146.

Naturally, the positions of the said coupling formations 148a, 148b and 148d as well as the clip 152 could be exchanged between the big-end fork part 142 and the cap 146 with respect to those illustrated and described.

Figure 10:
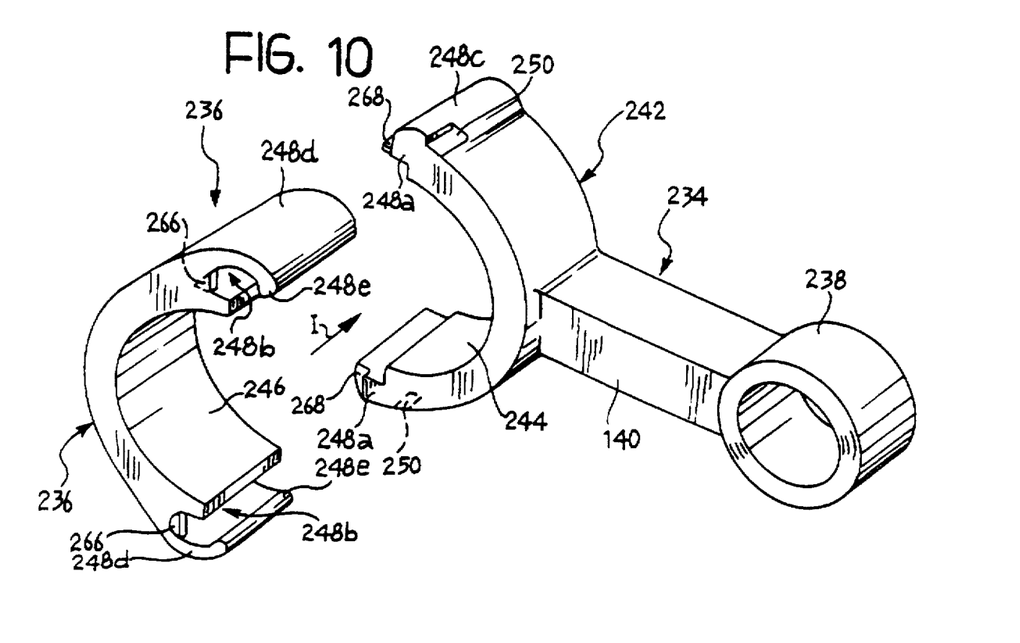
FIG. 10 is an exploded perspective view, similar to those of FIGS. 4 and 6, which illustrates a third embodiment of a connecting rod according to the invention.
Figure 11:
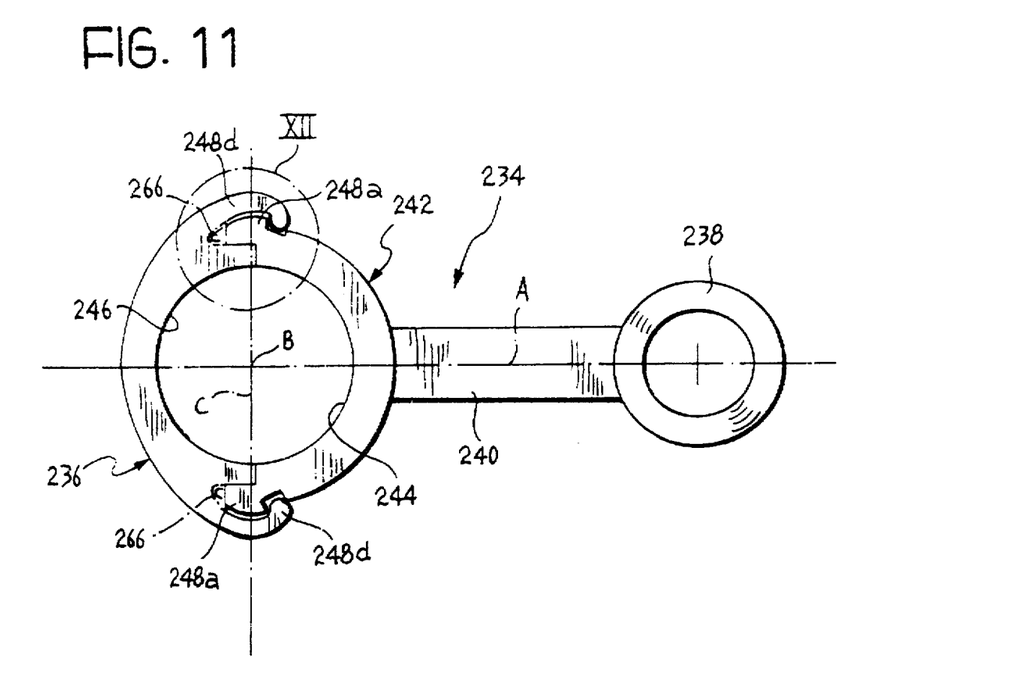
FIG. 11 is a side view of the connecting rod of FIG. 10.
Figure 12:
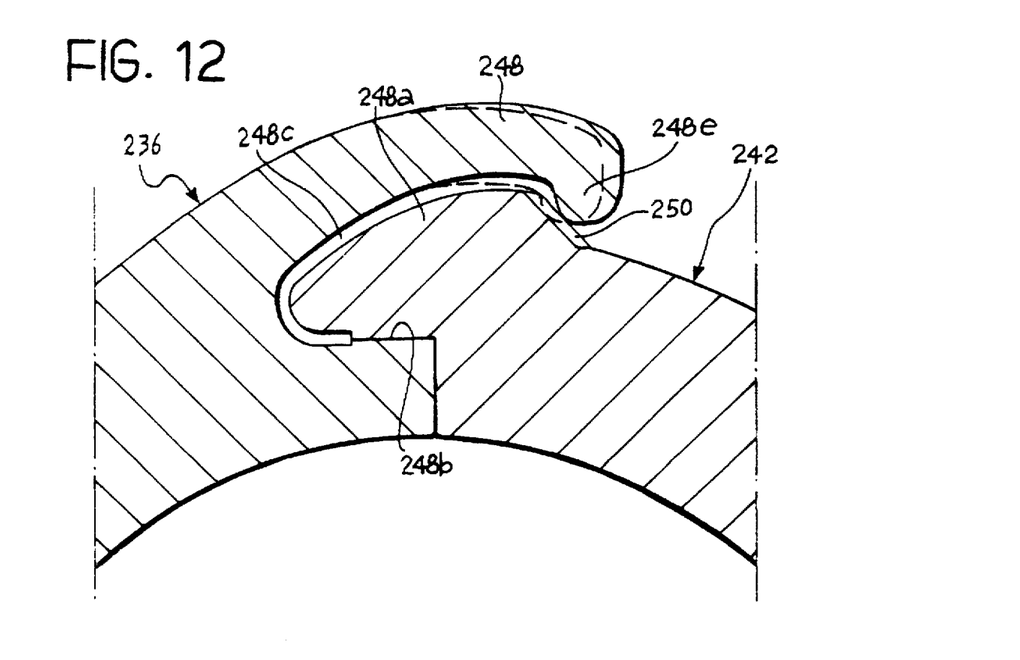
FIG. 12 is an enlarged section of the part enclosed in the chain line circle XII of FIG. 11.

Reference will now be made to FIGS. 10 to 12 to describe a third embodiment of the connecting rod according to the invention.

In these figures the same or similar parts to those of the preceding figures have been indicated with the same reference numerals increased by 200 with respect to FIGS. 2 to 5 and by 100 with respect to FIGS. 6 to 9.

The description of these parts will be limited to what is essential for comprehension.

In the embodiment of FIGS. 10 to 12 the two principal pieces 234 and 236 of the connecting rod are also preferably made of the materials indicated above. An essential requirement at least as far as the cap 236 is concerned, is that certain of its parts (the flanges 248d), which will be described in more detail below, have a slight elasticity.

In the embodiment of FIGS. 10 to 12 the two pairs of interfitting ends of the big-end fork part 242 and the cap 236 are specularly identical.

The two ends of the big-end fork part 242 are formed as tenons 248a, whilst the two ends of the cap 236 are formed as mortices 248b complementary to the tenons 248a.

Each tenon 248a forms an outer radial projection with an arcuate convex external curve 248c.

Each mortice 248b is delimited radially outwardly by a flange 248d which has a corresponding internal concave arcuate surface.

The two flanges 248d can be moved apart elastically to grip elastically on the respective external convex surfaces 248c.

When the cap 236 is not coupled to the big-end fork part 242 the flanges 248d are in a relaxed position such as that illustrated in broken outline in FIG. 12.

In this rest position the mutual coupling of the tenons 248a and the mortices 248b would not be possible due to their mutual interference.

To render this coupling possible each of the flanges 248d has, over the whole of its extent, a feeler projection 248e. Correspondingly, the outer convex surfaces 248c of the tenons 248a have a ramp 250 adjacent one of the sides of the big-end fork part 242.

Coupling of the two pieces 234 and 236 takes place by bringing up the cap 236 to one side of the big-end fork 242 in the direction of the arrow I of FIG. 10, or vice versa.

At the beginning of the coupling operation the projections 248e engage the ramps 250 causing the elastic separation of the flanges 248d.

The mutually coupled position is illustrated in FIG. 11 and more clearly in FIG. 12.

The coupling formations constituted by the tenons 248a and the mortices 248b serve both as means for preventing disengagement of the two concave facing surfaces 244 and 246 in the diametral plane, again indicated C in FIG. 11, and as gripping means to prevent mutual separation of the two concave surfaces 244 and 246 in the longitudinal direction of the stem 240, again indicated A in FIG. 11.

Preferably, the connecting rod of FIGS. 10 to 12 is also provided with shoulder means for preventing misalignment in the mutual sliding direction of the tenons 248a and the mortices 248b after they have been completely coupled together.

As illustrated in FIGS. 10 and 11, the shoulder means comprise a septum 266 which partly closes each mortice 248b at its end, and a facet 268 formed at the corresponding end of each tenon 248a and against which the corresponding septum 266 abuts at the end of the coupling operation.

Whilst an embodiment in which the tenons are formed on the big-end fork part and the mortices are formed in the cap has been described and illustrated, a connecting rod according to the invention could a-so be formed with the mortices on the big-end fork part and the tenons on the connecting rod cap.

What I claim is:

1. A connecting rod for small reciprocating machines, of the type comprising two separate main pieces, one of which includes a small-end part, a stem part extending in a longitudinal direction of the connecting rod, and a big-end fork part with a semi-cylindrical concave surface, and the other of which is constituted by a cap with a semi-cylindrical concave surface which is fixed to the big-end fork part to complete the big-end of the connecting rod and define, with the two facing concave surfaces, a cylindrical eye, and in which the big-end fork part and the cap are retained together by means of respective pairs of interfitting ends lying on a diametral plane of the eye of the big-end, wherein each of the two interfitting ends of each pair has mutual coupling formations so shared that, when coupled together, the two interfitting ends jointly prevent the two facing concave surfaces from becoming axially offset by sliding in the said diametral plane, and jointly prevent the mutual separation of the two concave surfaces in the longitudinal direction of the stem.

2. A connecting rod as claimed in claim 1, wherein the connecting rod is provided with shoulder means to prevent the semi-cylindrical concave surfaces of the eye from becoming axially offset at least by relative movement in a direction parallel to the axis of the eye.

3. A connecting rod as claimed in claim 1, wherein the mutual coupling formations of each pair of interfitting ends are so shaped as to be able to be coupled and uncoupled with a relative sliding movement parallel to the axis of the eye of the big-end.

4. A connecting rod as claimed in claim 3, wherein the mutual coupling formations of each pair are shaped as Z-shape couplings and are so disposed as to define between them a dovetail joint.

5. A connecting rod as claimed in claim 4, wherein at least one of the mutual coupling formations has a bevelled face on one side of the big-end, to facilitate initiation of the coupling operation.

6. A connecting rod as claimed in claim 3, wherein a shoulder means include at least one clip fitted to one of the pairs of interfitting ends and which, when these ends are mutually coupled, is so positionable as to surround opposite sides to maintain the parts of the big-end fork and the cap in correct alignment.

7. A connecting rod as claimed in claim 6, wherein the clip is in the form of a spring steel wire shaped into a substantially C-shape configuration with two parallel lateral sections interconnected by a dorsal section having a mid part re-entrant towards the interior of the C-shape and two end sections bent towards and aligned with one another, in that one of the elements constituted by the big-end fork and the cap has, adjacent its end, a pair of aligned holes which extend into the sides thereof and into which the said end sections of the clip are engaged, whilst the other of these elements has, adjacent its corresponding end, a notch facing away from the said diametral plane of the eye of the big-end and in which a re-entrant part of the dorsal section of the clip is snap-engaged when the clip is disposed with its lateral sections extending along the said opposite sides.

8. A connecting rod as claimed in claim 7, wherein the element which has the said holes for pivoting the clip is the big-end fork part and the element which has the said notch is the cap.

9. A connecting rod as claimed in claim 1, wherein at least the big-end fork or the cap is elastically deformable to allow separation or approach of its two ends, wherein for one of the pairs of interfitting ends the mutual coupling formations comprise, on one of the ends, a part-cylindrical formation acting as a pivot pin and on the other end a knuckle housing defining a corresponding part-cylindrical socket extending for more than 180° around the pin (148a), and wherein for the other pair of matching ends of the mutually coupling formations (148d) are so shaped as to allow snap-engagement thereof, the arrangement being such as to permit assembly of the connecting rod by introducing the pin into the socket of the knuckle housing in a direction parallel to the axis of the eye and a subsequent relative rotation of the parts of the big-end fork and the cap about the pivot to obtain the said snap-engagement.

10. A connecting rod as claimed in claim 9, wherein the said part-cylindrical socket has, on one side of the big-end, a flared section to facilitate the introduction of the pin into the socket.

11. A connecting rod as claimed in claim 9, wherein a shoulder means comprises, on one side of the big-end fork, an enlarged head at one end of the pivot pin able to abut against a corresponding end face of the knuckle housing.

12. A connecting rod as claimed in claim 9, wherein the said snap-engageable mutual coupling formations are shaped as a Z-shape coupling.

13. A connecting rod as claimed in claim 10, wherein a hook means comprise a clip associated with the said snap-engageable coupling formations, which clip is in the form of a spring steel wire of substantially C-shape with two parallel lateral sections interconnected by a dorsal section having a mid part re-entrant towards the interior of the C-shape and two bent end sections facing towards and aligned with one another, and wherein one of the elements constituted by the big-end fork part and the cap has, adjacent an end, a pair of aligned holes in its sides in which the said end sections of the clip are pivotally received, whilst the other of these elements has adjacent its corresponding end a notch facing away from the said diametral plane of the big-end eye and into which re-entrant part of the dorsal section of the clip is snap-engaged when the clip is disposed with its lateral sections extending along the said opposite sides.

14. A connecting rod as claimed in claim 13, wherein the element which has the said holes for pivotally receiving the clip is the big-end fork part and the element which has the said notch is the cap.

15. A connecting rod as claimed in claim 3, wherein for both pairs of matching ends the mutual coupling formations comprise, on one of the ends, a tenon forming a radially outer projection and, on the corresponding other end, a mortice delimited on its radially outer side by a flange which surrounds this projection.

16. A connecting rod as claimed in claim 15, wherein the radially outer projection of the tenon has a convex arcuate external surface and the corresponding flange of the mortice has a complementary concave arcuate internal surface.

17. A connecting rod as claimed in claim 15, wherein the flanges of the mortice can be elastically separated so as to engage with an elastic grip on the respective arcuate external surfaces.

18. A connecting rod as claimed in claim 17, wherein on one side of the big-end the arcuate external surfaces of the tenons have a ramp and the corresponding flanges of the mortice have a feeler projection engageable with the ramp to produce the elastic separation of the flanges when the coupling formations are coupled with the said mutual sliding movement parallel to the axis of the eye.

19. A connecting rod as claimed in claim 15, wherein the tenons are formed on the big-end fork part and the mortices are formed in the cap.

20. A connecting rod as claimed in claim 2, wherein said shoulder means includes a septum situated at one end of the mortice and an abutment facet formed at the corresponding end of the tenon.

* * * * *